United States Patent [19]

Kress

[11] Patent Number: 4,712,625

[45] Date of Patent: Dec. 15, 1987

[54] DRILLING AND PERCUSSION HAMMER

[76] Inventor: Willy Kress, Breitenwasen 21, D-7457 Bisingen, Fed. Rep. of Germany

[21] Appl. No.: 818,711

[22] Filed: Jan. 14, 1986

[51] Int. Cl.⁴ ................................................ B23B 45/16

[52] U.S. Cl. .................................... 173/104; 173/109; 173/122; 74/57; 74/22 R

[58] Field of Search ................ 173/122, 104, 109, 111; 74/22 R, 22 A, 56, 57

[56] References Cited

U.S. PATENT DOCUMENTS

| | | | |
|---|---|---|---|
| 2,646,100 | 7/1953 | Gibson | 173/117 X |
| 3,006,202 | 10/1961 | Moorhead | 74/22 A X |
| 3,331,452 | 7/1967 | Wanner | 173/117 X |
| 3,515,016 | 6/1970 | Jemison | 74/22 X |
| 3,995,745 | 12/1976 | Chambers | 74/22 R |
| 4,436,163 | 3/1984 | Simpson | 173/117 |

FOREIGN PATENT DOCUMENTS

| | | | |
|---|---|---|---|
| 201742 | 9/1923 | United Kingdom | 74/22 R |
| 572070 | 9/1945 | United Kingdom | 74/22 R |
| 846563 | 8/1960 | United Kingdom | 74/22 R |

*Primary Examiner*—Paul A. Bell
*Assistant Examiner*—Willmon Fridie, Jr.
*Attorney, Agent, or Firm*—McAulay, Fields, Fisher, Goldstein & Nissen

[57] ABSTRACT

Drilling or percussion hammer with an electric drive motor driving, preferably directly and without the use of any countershaft, a sleeve-like enlarged portion of the drive shaft leading to the tool holding fixture, with the entire striking mechanism being arranged within the said enlarged portion. The striking mechanism comprises a reciprocating driving piston whose cylindrical outer wall is provided with a closed, cam-like guiding groove which is engaged by a guide cam, preferably a driving ball, provided on the sleeve portion of the drive shaft which is driven in the rotary sense. The driving piston, which is permitted to move axially, but retained against rotation, derives the translatory movement of the driving piston directly from the torque supplied by the driving electric motor to the tool holding fixture, the driving piston accommodating in its interior in the conventional manner a striking piston which preferably is cushioned by an air cushion and which acts upon an anvil.

8 Claims, 4 Drawing Figures

DRILLING AND PERCUSSION HAMMER

BACKGROUND OF THE INVENTION

The present invention starts out from a drilling or percussion hammer according to the preamble of the main claim. A drilling hammer of this type has been known before (Swiss Patent Specification No. 637 056). In this known drilling hammer, a rotary sleeve is formed integrally with a tool holding fixture and is driven separately, without even participating in the striking process, by a pinion seated on an offset countershaft which is in turn driven by the driving electric motor via the motor shaft which is set off relative to both the rotary shaft and the countershaft. The design of the rotary sleeve which performs the function of a driving shaft for the tool holding fixture, as a hollow sleeve serves the purpose to permit a non-rotary guide tube to be arranged within the said sleeve, at a certain distance and stationary relative thereto, which guide tube encloses in turn an axially reciprocating, likewise non-rotary driving piston. The driving piston acts via an air cushion upon a coaxially seated striker mounted to slide within the same guide tube and imparting its percussion energy directly to the tool in the tool holding fixture.

The reciprocal sliding displacement of the driving piston in the stationary guide tube, which is typical of the design of the striking mechanism, is produced in the known drilling hammer separately by means of a swash plate drive which can be disconnected at desire and which is seated on the intermediate shaft or countershaft and comprises substantially a ring provided with a driving pin which scans, if necessary through the intermediary of a ball bearing, an oblique plane of division of a drum shrunk upon the countershaft, thus translating the rotary movement of the countershaft into the translatory sliding movement of the driving piston which is connected to the other end of the driving pin. The driving pin must be capable of acting upon the driving piston via a ball-type pivoting bearing permitting also axial displacements.

In the case of this known drilling hammer, the rotary energy generated by the electric drive motor is split up, starting from the countershaft, to take two different mechanical routes, i.e. to generate on the one hand the striking movements through the eccentric effect of the swash plate drive, and, on the other hand, to drive the rotary sleeve forming the drive shaft of the tool holding fixture via a separate pinion. The structure of such a drilling hammer is, therefore, extremely complex—it requires a plurality of bearings, sliding faces and pivoting points all of which must be lubricated and are subjected to corresponding wear. The striking mechanism, which is substantially formed by the swash plate drive of the countershaft, acts upon the tool holding fixture, which is driven in the rotary sense, separately and from the outside in offset parallel arrangement, the translatory reciprocating movement being generated externally of the area of the rotary sleeve and the guide tube, only reduced in length by the lever action. The drilling hammers known from the following publications can be classified also to belong to this first category in which the striking action is generated via a swash plate drive: German Disclosure Document No. 32 13 671, German Disclosure Document No. 32 13 672, German Disclosure Document No. 32 05 141, European patent application No. EP 0050 192 A1.

A second basic principle of generating the striking effect with the aid of a stationary, but pivoting knee lever has been known for example from the following publications: German Disclosure Document No. 33 07 482, German Disclosure Document No. 33 05 720. In the case of these knee lever striking mechanisms, the rotary energy supplied by the driving electric motor is also clearly split up on the one hand for generating the striking effect, and on the other hand for ensuring the rotary drive of the drive shaft of the tool holding fixture which is always sleeve-shaped in the broader sense, and this because the parts required for transmitting the externally generated percussion energy have to be arranged coaxially and concentrically with the drive shaft and, preferably, within its hollow interior space. A countershaft or intermediate shaft, which is likewise present in these arrangements and which is driven by the electric motor, primarily via a pinion, carries a collar-like driving part receiving eccentrically the one end portion of the rigid, separately pivoted knee lever. The second arm of the knee lever, which may extend substantially at a right angle relative to the first arm, engages in sliding relationship a slot of a pivot bearing arranged in the driving piston for the striking action. During rotation of the motor shaft and, correspondingly, the countershaft, the first arm is caused to move along a conical surface so that the second arm of the knee lever is forced to perform a pivoting movement whereby the driving piston is caused to perform a reciprocating movement.

The knee point of the knee lever is rigid only as regards the fixed relative angular position of its arms, while it requires a comparatively complex rotary and sliding connection which can be achieved by means of oblong holes and joint pins, because the second arm of the knee lever, which is connected with the driving piston, is in a position only to take over the translatory portion of the eccentric rotary movement of the first arm of the knee lever.

It is not least because of the plurality of the parts that are to be moved, to be seated and to be interconnected via sliding faces, ball bearings, joints and the like, that the known drilling hammers exhibit a very complex design and are, accordingly, expensive to produce and rather difficult to assemble, and in addition very heavy and bulky and, consequently, difficult to handle by the user (nose-heaviness).

Now, it is the object of the present invention to provide a drilling or percussion hammer which can do with a smaller number of moving parts and, accordingly, a smaller number of bearing points, and which offers a particularly simple and compact design while providing the same striking force.

ADVANTAGES OF THE INVENTION

This object is achieved by the drilling and percussion hammer according to the invention by the characterizing features of the main claim. The invention departs drastically from the possibilities known so far for generating the striking effect in drilling hammers and avoids in particular any splitting of the rotary energy, which heretofore normally has been effected using mechanical means, in the area of the intermediate shaft or countershaft which can be dispensed with fully in the arrangement according to the invention.

In the arrangement of the present invention, the means for transmitting the torque to the tool holding fixture on the one hand and the means for generating the striking action on the other hand are nested and integrated into each other and are both driven via the same primary drive element which in turn is driven preferably directly by the pinion of the armature shaft. So, the drive shaft for the tool holding fixture, which is designed as a hollow sleeve over part of its length and which is driven by the armature pinion, serves simultaneously as the primary drive element for the generation of the striking action which takes place completely inside the sleeve. The invention can do absolutely without any translatory sliding movements acting from the outside upon the rotary shaft area of the drive shaft, and also without any eccentric effects of the conventional type derived from rotary drives. This provides the following decisive advantages as regards complexity and cost:

1. The number of moving parts and components is substantially reduced, i.e. to a total of four parts including the drive shaft for the work holding fixture, the reciprocating movement of the driving piston or exciting cylinder acting on the anvil being derived directly, without any intermediary moving parts, from the rotary movement of the rotary sleeve of the drive shaft which is transmitted to the tool holding fixture.

2. The arrangement does without any intermediate shaft or countershaft which is driven via pinions through the motor shaft and which would split up the torque supplied by the electric motor into the rotary driving force for the tool on the one hand and for the striking action on the other hand.

3. All components serving to produce the rotary and striking forces acting upon the tool holding fixture are arranged concentrically relative to each other so that a total of two bearing areas whose axes extend in parallel to each other are required - one for the armature of the electric motor and another one for the rotary and striking drive.

4. The considerably reduced number of parts permits an extremely short and compact design of the drilling hammer according to the invention.

5. The small number of parts required permits a particularly light-weight design of the drilling hammer according to the invention.

6. The entire drive unit which serves to transmit the torque and to generate the striking action may, preferably, be pre-assembled in a separate inner or partial housing and may then be mounted as a complete assembly in a housing of the semimonocoque construction type that can be produced at low cost.

7. The considerably reduced number of bearing points, movable parts and sliding connections leads to a considerable reduction of the frictional losses encountered so that greater efficiency can be achieved with a comparable power consumption.

8. The lower number of moving parts results in lower mass inertia.

9. The lower number of moving parts and the correspondingly lower number of bearing points facilitates, simplifies and reduces the lubrication of the unit.

10. The fact that the elements of the drive for the rotary movement and the striking action of the drilling hammer are nested coaxially and concentrically within each other helps considerably reduce the nose-heaviness of such machines - a fact which is of quite considerable importance for the ease of use of such units.

11. The basic simplicity of the structure and coaction of the components still required for generating the striking action and the rotary driving force permits the production cost of the machines according to the invention to be considerably reduced so that genuine drilling hammers are now accessible to broad circles of customers, either instead of or in addition to the usual drilling machines.

12. The reduced number of parts facilitates essentially the assembly of such machines which can even be carried out by less skilled staff, and also any maintenance and repair work that may become necessary.

It is a further decisive advantage of the drilling hammers according to the invention that their simplified construction and improved compactness are not obtained at the cost of reduced efficiency of the drilling hammer as such, because the drilling hammer action is derived in the usual manner from the reciprocating movement of the driving piston or exciting cylinder and may, starting at this component, be realized in the same manner as usual heretofore, i.e. using a freely moving striking piston in the driving or working piston to which the reciprocating movement is imparted by pneumatic means utilizing air cushion effects. The kinetic energy of the striking piston may then act upon a so-called anvil which in turn acts upon the tool shank and/or the shank of a tool holder.

The features specified in the sub-claims permit advantageous developments and improvements of the drilling hammer described by the main claim.

BRIEF DESCRIPTION OF THE DRAWING

One embodiment of the invention is shown in the drawing and will be described hereafter in detail. In the drawing.

DESCRIPTION OF THE EMBODIMENTS

The basic concept of the present invention consists in the idea to integrate the generation of the striking action in a drilling hammer completely into the area of the rotary sleeve of the drive shaft of the tool holding fixture so that the torque produced by the electric drive motor is sort of split up only internally and transmitted primarily to the tool in the tool holding fixture without any relative rotary movements and without any introduction of an externally generated translatory movement into the area of the rotary sleeve of the drive shaft.

Figure 1:
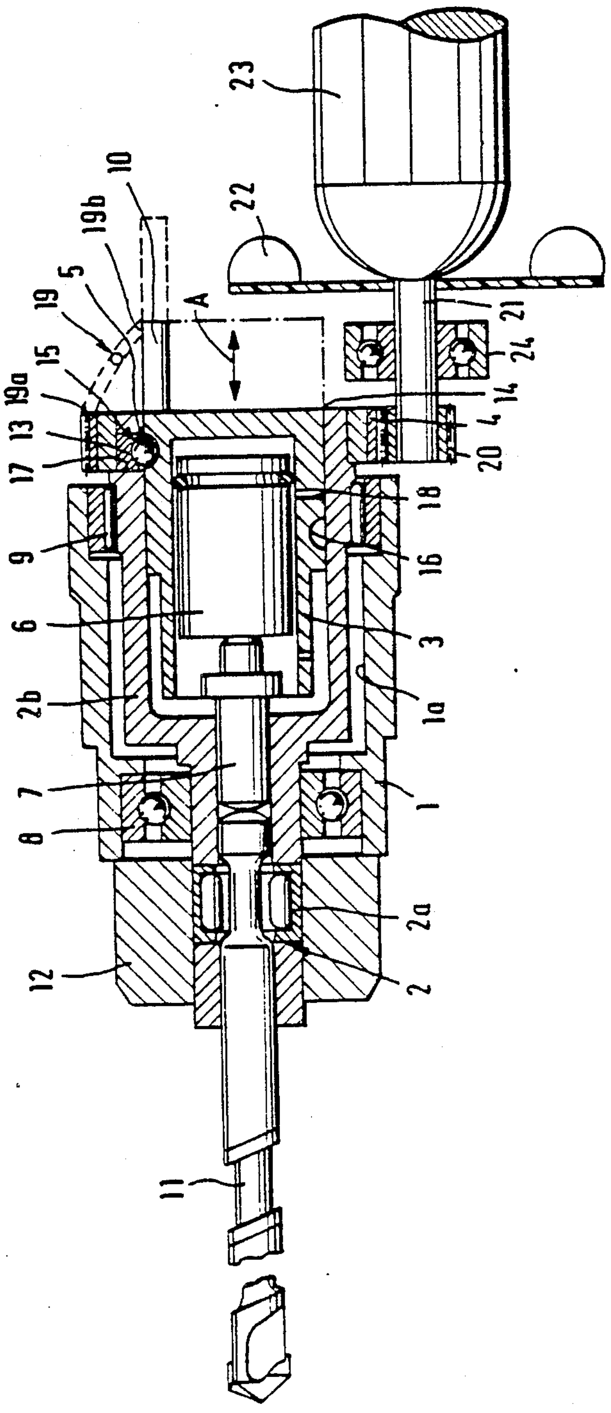
FIG. 1 shows a side view of the drive section generating the driving and striking force in one embodiment of the drilling hammer according to the invention, the arrangement of the electric drive motor being indicated schematically only.

In FIG. 1, reference numeral 1 designates a component of the kind of a housing receiving all transmission and working components for the transmission of the rotary driving force and the striking action to the tool holding fixture. This component can be pre-assembled completely and then preferably mounted in the basic housing of the drilling hammer according to the invention, which in turn preferably may be of the semimonocoque construction type. The housing component 1, which, consequently, receives all moving parts and transmission elements, may be made from any desired material such as aluminium, steel or even a plastic material, and takes the form of a cylindrical sleeve provided with a stepped inner bore 1*a*. The inner bore 1*a* accommodates the drive shaft 2 which is driven in the rotary sense and seated for this purpose on the one hand in a needle bearing 9 and on the other hand in a ball bearing 8. The drive shaft 2 preferably is designed as a full-length hollow shaft the front end of which—i.e. the left end in the drawing—may form the tool holding fixture 2*a* for the drill 11, which is then completed by the usual tightening sleeve 12 for the drill.

The righthand portion 2*b* —as viewed in the drawing—of the drive shaft which is considerably enlarged in diameter to serve as a guide tube, accommodates the working or driving piston 3 which may also be described as the exciting cylinder because it accommodates in its interior in sliding relationship the striking piston 6 which actually produces the striking action. The relationship between the driving piston 3—this term will be used hereafter to describe the before-mentioned piston—and the guide tube 2*b* of the driving shaft 2 which is driven in the rotary sense is clearly defined by a guide cam 15 projecting inwardly from the guide tube 2*b* and engaging a guide track 16 of the driving piston 3. The cam or guide track 16 extends in a loop-shaped closed form obliquely across the cylindrical periphery of the driving piston. Its contour and form can be seen best in the representations of FIGS. 2, 3 and 4. The projected shape of the oblique contour of the guide track 16 for the guide cam 15 across the outer cylindrical wall of the driving piston resembles approximately an ellipse so that, as will be easily seen, the driving piston, when fixed against rotation, will necessarily and directly be set into a reciprocating movement as indicated by arrow A in FIG. 1 when the drive shaft 2 together with the guide tube area forming part thereof perform a rotary movement. This forced reciprocating movement of the driving piston 3 is obtained due to the direct translation of the rotary movement of the drive shaft because the arrangement of the guide cam is such that part thereof, i.e. the lower portion as viewed in FIG. 1, projects into the guide track 16 of the driving piston 3 and that it is at any time fixed to the same point of the guide tube 2*b* or, as is the case in the embodiment shown in the drawing where the guide cam takes the form of a driving ball 5, extends at any case partially into a bore 17 of the guide tube 2*b* where it is seated and retained in position.

It appears that as long as the driving piston 3 is restrained against rotation, for example by acting stationarily, but in sliding relationship upon a retaining cam 10 fixed thereon or formed as an integral part thereof, the drive piston will perform strokes in synchronism with the rotary speed—at any rate if one regards initially the case where the driving piston 3 is restrained absolutely against rotation by the driving shaft 2—the length of the stroke being determined by the inclination of the track 16 on the outer wall of the cylindrical face of the driving piston 3. Thus, the driving piston 3 is guided forcedly in the guide tube 2*b* of the guide shaft 2, which is designed in the form of a rotary sleeve, and the forced reciprocating movement of the driving piston 3 resulting therefrom results in a corresponding reciprocating movement of the freely movable striking piston 6 accommodated within the hollow interior of the driving piston 3 and forming the primary striking body. During the forward stroke, the striking body 6 therefore transmits its kinetic energy to the anvil 7 which is seated in the narrower portion of the inner bore of the hollow drive shaft 2 and which in turn acts upon the tool shank and/or the shank of the tool holder, if any. From this point onwards, i.e. starting with the movement of the striking piston 6, the transmission of the striking action may be realized in the conventional manner. The same applies to the way in which the striking piston 6 is seated within the driving piston 3 utilizing an air cushion effect. To this end, the wall of the driving piston 3 is provided with at least one air bleed 18 which is closed by the edge of the striking piston 6 when it moves across the bleed during its return motion so that an enclosed air cushion is obtained at the base of the bore of the driving piston 3 which exerts a resilient braking effect upon the striking piston 6.

According to a preferred embodiment of the invention, which also has for its purpose to facilitate the assembly, the driving ball 5 received in the bore 17 of the guide tube 2*b* and forming the guide cam is retained in the said bore by mounting, preferably forcing a drive gear 4 upon the rear portion of the guide tube of the driving gear, if desired after additional application of a ball cover 13, so that the driving ball 5 is simultaneously covered thereby in its bore 17.

According to a further improvement of the invention, it is possible without any difficulty to switch over from the drilling mode to the percussion drilling mode, it being in addition possible to adjust the striking rate continuously, subject to corresponding reduction, between a striking rate synchronous to the rotary speed—related to the rotary speed of the drive shaft 2—and the striking rate zero.

This can be achieved in several ways. If the unit according to the invention is intended to be used as a pure drilling hammer, one may, for example, fix the driving piston 3 in a manner avoiding any rotational movement but permitting axial sliding movements, for example by means of a retaining cam 10 formed integrally therewith or else fastened in a suitable manner thereto, and by causing a pin fixed to the housing to slide either at the retaining cam 10, which reciprocates together with the driving piston a, or in a groove provided thereon.

Another solution consists in extending the drive piston 3 outwardly in the form of a sleeve, i.e. beyond the portion where it is enclosure by the guide tube 2*b* of the drive shaft 2, and to brake its rotary movement more or less by means fixed to the housing which can be operated from the outside so that the driving piston 3 can partly be entrained by the rotation of the guide tube 2*b*, with the striking rate thereby being simultaneously reduced, relative to the rotary speed. The adjusting means fixed to the housing may be designed in the manner of a slipping clutch, or else as slipping belts embracing the sleeve-shaped extension.

If the unit is to operate as a pure drill, without any percussion action, it may be assumed that the small frictional force encountered between the sliding driving ball 5 and its respective partial guides causes the working piston 3 to be entrained by the rotary movement so that when the working piston A is released by stationary means (i.e. not fixed in position) the striking action is equal or almost equal to zero.

A further improvement of the present invention consists in the possibility to provide that no striking action occurs in the no-load operation. This is achieved by providing means exerting a more or less rigid coupling effect on the driving piston 3 only when the tool 11 is loaded by drilling. To this end, it is possible to arrange the entire tool holding fixture, including the drive shaft 2, in such a manner that they are permitted to be displaced easily, at least slightly, so that during use under load a small relative displacement of the drive shaft 2 towards the right in FIG. 1 is obtained. The arrangement of a pivotable, large-angle knee lever which is fixed at the housing, as indicated in broken lines at 19, allows already the one knee lever end 19*a* to slide under pressure upon the smooth rear end face of—in the present case—the driving gear 4, whereby a corresponding pressure and, insofar, braking effect is obtained via the knee lever at the other end 19*b* thereof which acts upon a sleeve-shaped extension of the drive piston 3 and prevents the latter more or less, if desired in response to the load, from being entrained by the rotary movement and adjusts the striking rate to the maximum value or to other intermediate values in the presence of sliding friction.

The particularly simple structure of the transmission section of the drilling hammer 10 according to the invention is completed, as indicated diagrammatically in FIG. 1, by a driving pinion 20 mounted on the armature shaft and meshing with the driving gear 4 of the hollow drive shaft 2, and by the fan blade indicated schematically at 22 and the armature section of the electric drive motor indicated at 23. Reference numeral 24 designates an antifriction bearing for the armature shaft.

Figure 2:
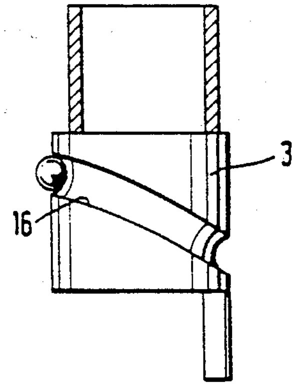
FIGS. 2, 3 and 4 show different, partly sectional, views of the working or driving piston.
Figure 3:
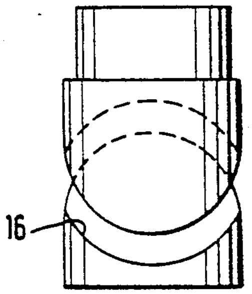
Figure 4:
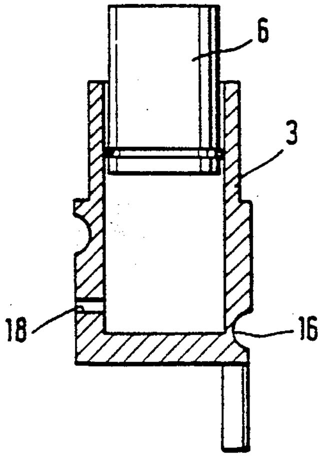

The pronounced cam shape of the track 16 on the driving piston 3, which permits the driving ball 5 to slide easily and substantially free from friction, can be seen very clearly in the representations of FIGS. 2, 3 and 4, FIG. 3 showing also in broken lines the full loop-shaped elliptical form of the track.

All the features described or shown in the specification, the following claims and the drawing may be essential to the invention either individually or in any desired combination.

I claim:

1. A drilling or percussion hammer for use with an electric drive motor at least indirectly connected with a drive shaft having a tool holding fixture, said drive shaft comprising a hollow rotary sleeve, and a striking mechanism in driving relation therewith and having an axially reciprocating drive piston within said hollow sleeve for imparting its percussion energy to said tool holding fixture; characterized in that said rotatable sleeve is substantially stationary in the axial direction, and said striking mechanism includes a guide cam on the interior of said sleeve, and a peripherally extending, closed loop-shaped oblique guiding groove on said driving piston engaging said guide cam, whereby rotation of said sleeve effects axial movement of said drive piston.

2. Drilling or percussion hammer according to claim 1, characterized in that the outer casing of the drilling or percussion hammer receiving the housing is of the semimonocoque construction type.

3. Drilling or percussion hammer according to claim 1, characterized in that the guide cam comprises a driving ball seated to slide in a bore in said sleeve and engaging said groove and a driving gear on the end portion of said sleeve for covering said bore.

4. A drilling or percussion hammer as in claim 3, and drive means for driving said drive shaft comprising a motor having an output shaft, and a gear on said output shaft in driving relation with said driving gear on said sleeve to rotate the same.

5. A drilling or percussion hammer as in claim 1, characterized in that said drive piston is hollow and includes a striking piston slidably received in said drive piston, said drive piston having an end wall which defines an air chamber with said striking piston to provide an air cushion for said striking piston, an anvil on the tool holding fixture adapted to be struck by said striking piston during operation of said hammer, and means connected to said drive piston for preventing rotational movement thereof.

6. A drilling or percussion hammer as in claim 1, further including a housing adapted to be inserted into the casing of a drill hammer, said housing receiving therein, in concentric and coaxial relationship to each other, as viewed from the outside to the center, said drive shaft, said drive piston and said striking piston.

7. A drilling or percussion hammer as in claim 6, in which said drive shaft is provided with a stepped outer surface, at least one needle bearing and at least one antifriction bearing in said housing engaging different portions of the outer surface of said drive shaft to support said drive shaft therein.

8. A drilling or percussion hammer as in claim 1, in which said drive piston extends outwardly of said sleeve, and braking means connected to said drive piston extension for controlling the rate of movement thereof.

* * * * *